United States Patent Office 3,734,716
Patented May 22, 1973

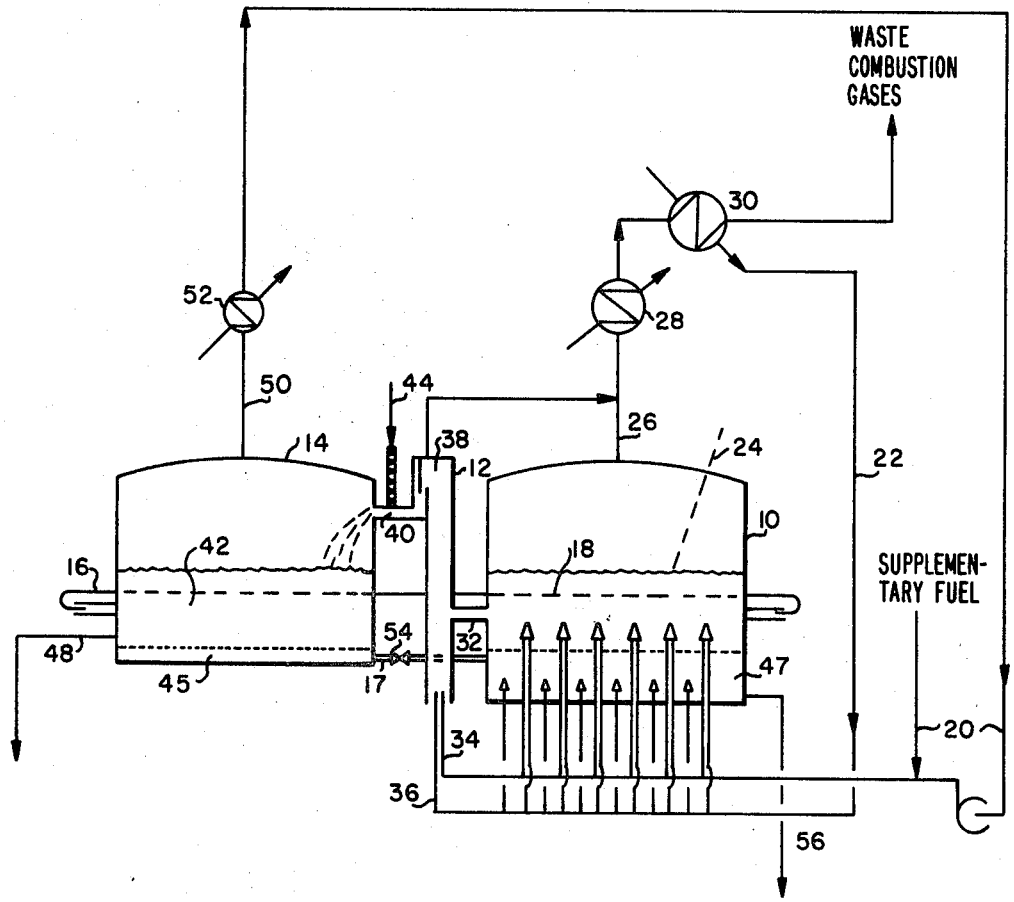

3,734,716
STEELMAKING PROCESS
Leonard Seglin, New York, N.Y., and Charles A. Gray, Charleston, W. Va., assignors to FMC Corporation, New York, N.Y.
Filed Nov. 18, 1971, Ser. No. 200,033
Int. Cl. C21b 1/02, 13/14
U.S. Cl. 75—28                                              1 Claim

ABSTRACT OF THE DISCLOSURE

Iron ore is melted, together with recycle slag and a flux if necessary, in an oxidizing zone to a temperature substantially higher than that necessary for carbon to reduce the ore to the metal; the hot molten material is pumped into a separate reduction zone into which carbon is fed to reduce the oxidized iron to iron; the molten slag from the reduction, cooled substantially by the endothermic reaction, is then in part recirculated back to the oxidizing zone and in part removed from the process; the iron is fed back to the oxidizing zone, below the slag level, and is converted to steel by the use of oxygen, and chemical additives as needed.

BACKGROUND OF THE INVENTION

Field of the invention

This invention relates to the production of steel by reduction of iron ore to pig iron and conversion of the pig iron to steel.

Prior art

The production of pig iron from oxidized iron ores by reduction with carbon is a most important one in our economy. The problem of reducing costs has attracted the attention of countless researchers.

Pig iron is conventionally produced in the blast furnace. There, fuel, primarily expensive metallurgical coke, and preheated air are burned to CO in the hottest portion of the furnace. CO and residual nitrogen then rise through a slowly-moving packed bed of solid burden consisting of specially prepared ore, flux and coke, preheating the bed and accomplishing some prereduction of the ore in the solid phase. Slag and molten metal both fall to the bottom of the furnace and are tapped periodically. CO is collected from the top of the furnace and burned with additional air in stoves to preheat incoming air.

The extent of burden preparation required by the blast furnace contributes to the high cost of the process. The moving bed of feed materials in the upper portion of the blast furnace must be strong enough to support the bed above it and must be open enough to allow the passage of gas without excessive pressure drop so that the charge must meet these conditions. The availability of cheap coke at the blast furnace site is a precondition to economic operation, and the lack of coke has often prevented building of a steel industry in a desired location.

Generally, the pig iron is tapped from the blast furnace, and converted to steel by some technique which reduces the content of undesired metals and adds others, by treatment with oxygen and selected slagging additives. This involves other equipment, with necessary additional capital investment.

Investigators have recognized the shortcomings of the blast furnace, and have striven to develop processes which require minimum capital cost, minimum charge preparation, and cheap reductants. Agarwal et al. (in U.S. Pat. 3,264,096 issued Aug. 2, 1966) melt iron ore and flux by heating with a flame produced by burning fuel in substantially undiluted oxygen, to produce an ore melt at about 3000° F. The molten ore is fed to a reducing chamber, where a finely ground reductant is mixed with it. Heat of reduction is supplied by oxidizing any reductant which rises to the slag surface with oxygen, in the space above the slag, to carbon monoxide, which is used to provide heat in the melter. The process has the great disadvantage that heat transfer is a function of exposed slag surface, so that it becomes progressively harder to get adequate heat transfer as depth of charge is increased; hence, scale-up of such a process is most difficult.

In our copending application Ser. No. 108,347, entitled "Ore Reduction With Slag Heat Transfer" and filed Jan. 21, 1971, we have described a process which overcomes the problems posed by the suggestions of Agarwal et al. It utilizes the suggestion made in British Pat. 1,804,- 317, published Sept. 20, 1967, that a circulating slag pool be used as a source of heat, but gets effective results where the British patent does not, by changing the methods of operation. In the method of our copending application, we operate by continuously introducing ore, with or without flux, fuel and oxygen, into an oxidizing section containing a molten recycle pool to melt the ore and produce a melt with a temperature about 225 to 350° F. higher than required to reduce the iron in the ore with carbon, continuously propelling the melt to a physically separated reducing section, most preferably by heated gas lift, introducing carbon into the reducing section along with the melt, permitting the reduction to be carried out to produce iron and a molten slag continously, returning a substantial portion of the slag to the oxidizing section to help melt the incoming ore and provide heat transfer essential for the process, and removing the desired iron from the reducing section as required.

RELATED APPLICATIONS

This application is related to our copending application Ser. No. 108,347, filed Jan. 21, 1971 and to our copending application entitled "Production of Phosphorus and Steel from Iron-Containing Phosphate Rock," filed simultaneously herewith.

OBJECT OF THE INVENTION

The object of the present invention is to convert the process of our above copending U.S. patent application Ser. No. 108,347, filed Jan. 21, 1971 to the production of steel without any substantial capital addition.

STATEMENT OF THE INVENTION

This objection is attained, in accordance with the present invention, by continuously introducing ore with or without flux, fuel and oxygen into an oxidizing section containing a molten recycle pool to melt the ore and produce a melt with a temperature about 225 to 350° F. higher than required to reduce the iron in the ore with carbon, continuously propelling the melt to a physically separated reducing section, most preferably by heated gas lift, introducing carbon into the reducing section along with the melt, permitting the reduction to be carried out to produce iron and a molten slag continuously, returning a substantial portion of the slag to the oxidizing section to help melt the incoming ore and provide heat transfer essential for the process, transferring the iron from the reducing section to the oxidizing section below the slag level, converting the iron to steel in the oxidizing section, and tapping steel from the bottom of the oxidizing section.

THE DRAWING

The drawing is a schematic flow sheet of the process of the invention.

DETAILED DESCRIPTION OF THE INVENTION

In accordance with this invention, an ore of an oxidized element, such as iron oxide, iron carbonate or phosphate rock (calcium phosphate), is fed into an oxidizing-melting section, where it mixes with recycle slag from a reducing section, and is melted and heated to a temperature sufficiently above that necessary to produce the element by carbon reduction of the ore, so that the melt requires no additional heat to complete the reduction reaction. The melted ore itself has a limited heat capacity; slag is mixed with it to provide the necessary heat for reduction. In general, the melt coming from the oxidizing section must be about 125° C. (225° F.) hotter than reduction temperatures for the process to work with reasonable recycle ratios. Optimum results are obtained at a differential of about 167 to 193° C. (303 to 350° F.). Where the differential exceeds about 193° C. (350° F.), heat losses are greater, and attack on refractories becomes more severe. These disadvantages are balanced in part by lower slag recirculation requirements, so that improvement in refractories, for example, could make higher temperatures economic.

The oxidizing-melting section is heated with any desired fuel, in any desired fashion. The preferred method of heating is by submerged combustion of gaseous and/or solid fuel under the slag surface. Carbon monoxide from the reducing section is preferably utilized, together with supplemental fuel which may be gas, cheap coal or other economical fuel source. The desired temperatures can easily be obtained by using air; once the process is started, it is only necessary to add the heat used in the reduction process plus that lost by radiation in off-gases and in product, so that high-temperature oxygen flames are not necessary.

The oxidizing section is made of refractory material suitable for the materials being handled. Most preferably, the refractories are cooled so that their inner surfaces will freeze an adjacent layer of slag which protects the refractory from attack by molten slag. This method of preventing refractory attack by slag is well known in the art, and forms no part of this invention.

The reducing section should be physically separated from the oxidizing section, so that the high-temperature melt goes into the reducing section free of oxidizing gases; it is preferably charged into the reducing section from above onto the surface of the melt so that the fresh material will mix with the carbon reductant which is likewise fed onto the melt surface.

Mechanical transfer of the melt is possible, e.g. a series of ladles functioning as an elevator, but the maintenance problems inherent in any mechanical device operating at 1500° C. or so suggest the desirability of using some other approach. Magnetohydrodynamic pumps can be used where the melt has sufficient electrical conductivity. The simplest and preferred means of transferring the hot melt is a gas lift. Most conveniently, the gas lift is fed by a mixture of carbon monoxide from the reducing section and air preheated by the waste gases, the combustion of the carbon monoxide producing sufficient heat to get the gas lift up to the melt temperature and thus prevent cooling of the melt during transfer. The lift is simple, has no mechanism exposed to melt temperatures, and delivers the melt at the desired temperature to the reducing section.

The reducing section offers no problems of construction which differ from conventional practice, being less destructive of refractories because of the total absence of exotherms in the system. In this section, carbon reductant, generally suspended in carbon monoxide, or less desirably in an inert gas like nitrogen, is fed onto the surface of the melt in the section along with superheated slag from the gas lift, and is mixed with it. The reaction is probably partially between liquid and completely surrounded solid and partially between a gas layer and solid. As the reaction progresses, the reduced iron sinks to the bottom of the melt to form a pool of molten iron. The slag is maintained at the desired level by recycling the necessary amount to the oxidizing-melting section, and removing an amount corresponding to new slag being formed from the new ore plus flux being added.

At the same time, the reduced metal is allowed to flow to the oxidizing section, where it forms a pool which is deeper than the pool in the reducing section. In the oxidizing section, air is injected into the body of the iron, to burn out carbon in the pig iron. The undesired elements, such as silicon and sulfur, are reduced to acceptable levels by the covering pools of recycling slag. The pig iron converter will operate at about the same temperature as in the oxidizing-melting section.

Obviously, the reduction process must be run continuously, on economic considerations. It can be started up in the oxidizing section with ore and flux, but is most conveniently started up after shutdown by melting old slag from the slag heap. The steelmaking portion of the process can be batched by shutting off flow from the reducing section as desired, but ideally the conversion should be conducted continuously so as to create a minimum of control problems in the adjacent reducing and oxidizing-melting sections.

The drawing illustrates how the process may be carried out. An oxidizing-melting section 10, a transfer device 12, a reducing section 14, a slag recycle line 16 and a hot-metal transfer line 17 are the fundamental units used in the process. A body of melt 18, largely recycled slag, is maintained in the oxidizing-melting section 10; it is heated by fuel from lines 20 which is burned with air from lines 22, preferably by submerged combustion in the melt 18.

Iron ore and flux are fed into the melt 18 through line 24, and are merged into the melt body 18. Combustion gases pass into a line 26, and are utilized to heat a waste-heat boiler 28 and preheat air for the combustion in a heat exchanger 30 before being exhausted into the stacks. If necessary, cyclones and/or dust precipitators may be installed in the exhaust-gas line.

Near the top of the slag in the oxidizing-melting section 10 is a line 32 through which melt 18 feeds into the gas lift 12. The liquid 18 is lifted by a stream of hot gas formed by burning carbon monoxide, in line 34, with preheated air in line 36, to get enough heat so that the gas lift 12 does not chill the melt 18. In the top 38 of the gas lift 12, the slag and gas are separated, the slag discharging through pipe 40 into the reducing section 14, the gases joining the exhaust gases from the oxidizing-melting section 10.

The stream of melt 18 discharges into the top of the reducing melt 42 in the reducing section 14. As it discharges it mixes with a stream of reducing agent 44, mostly finely divided carbon carried in carbon monoxide or, less preferably, in an inert gas like nitrogen. Since the temperature is sufficiently high, reduction takes place rapidly, with absorption of the endothermic heat of reaction, and iron pool 45 is formed, along with more slag and carbon monoxide. Iron 45 flows through line 17 at the bottom of the reducing section 14 back to pool 47 in the oxidizing section 10; sufficient slag to maintain the melt 18 at the desired level is likewise tapped off through line 48, and the remaining slag recirculates by gravity to the oxidizing-melting section 10 through slag recycle line 16.

The carbon monoxide goes overhead through line 50 through a waste-heat boiler 52, back to fuel line 20. The walls of the various sections may be water-cooled in known fashion, if desired, to maintain a layer of solidified slag to protect the refractory linings of the vessels; this is an expedient well known in the art.

A valve 54 is provided in line 17, through which the iron transfers to the oxidizing-melting section 10, so that, when a body of iron has accumulated in that section 10, the valve 54 can be closed, and the iron in pool 47 can be converted to steel by blowing the iron pool 47 with preheated air 22, while fresh iron accumulates in the reducing section 14. The steel is tapped off through line 56, and the valve 54 is reopened to reestablish pool 18.

As distinguished from most prior-art processes where the reaction occurs at a surface, the principal reactions here are in the body of the melt, so that relative heat losses, which are surface-related, are reduced as the process is scaled up.

EXAMPLE OF THE INVENTION

The amounts of slag needed for the process depend on the desired rate of reaction, the particular ore used, the desired temperature differential between the oxidizing-melting section and the reducing section, and the heat losses in the system. A typical plant to make 1 million tons of steel per year (3,200 tons per day), using a temperature of 2700° F. in the reducing section and 3000° F. in the oxidizing-melting section, with a high-volatile bituminous B coal as the supplemental fuel and source of reductant and Mesabi Range hematite as the ore, would require the following daily tonnages of materials:

|  | Stream number | Tons per day | Temp (° F.) |
|---|---|---|---|
| Ore plus flux | 24 | 7,500 | 70 |
| Char to reducer | 44 | 1,640 | 70 |
| Coal (supplemental fuel) | 20 | 505 | 70 |
| Slag to air lift | 40 | 64,100 | 3,000 |
| Slag to oxidizer-melter | 16 | 70,080 | 2,700 |
| Pig iron to converter | 46 | 3,270 | 2,700 |
| Air to pig iron converter | 51 | 1,250 | 1,000 |
| Air for combustion | 36 | 14,000 | 1,000 |
| And would produce: |  |  |  |
| Steel (0.5% carbon) | 52 | 3,200 | 2,700 |
| Slag to waste | 48 | 2,420 | 2,700 |
| Carbon monoxide to oxidizing-melting section (dry) | 50 | 3,000 | 2,700 |
| Waste gas to heat recovery and stack | 26 | 18,870 | 3,000 |

Obviously, the example can be multiplied indefinitely without departing from the scope of the invention as defined in the claims.

We claim:
1. The method of producing steel from an iron ore which is reducible with carbon which comprises (1) continuously introducing ore, fuel and oxygen into an oxidizing-melting section containing a molten pool of recycle slag to melt the ore into the slag and heat the slag to a temperature at least 225° F. higher than the operating temperature of a second physically separated reducing section; (2) continuously propelling the melt into the reducing section; (3) continuously adding carbon to the reducing section to react with the ore to produce molten iron and molten slag; (4) recycling a sufficient portion of the slag to the oxidizing-melting section to maintain the desired amount of slag in the process; (5) removing excess slag from the process; (6) transferring the molten iron to the bottom of the oxidizing-melting section below the slag; (7) treating the molten iron with oxygen to reduce its carbon content to the level of steel; and (8) recovering the so-produced steel.

References Cited

UNITED STATES PATENTS

| 1,156,775 | 10/1915 | Haas | 75—40 |
| 1,313,274 | 8/1919 | DeBarros | 75—92 |
| 2,517,557 | 8/1950 | Graham | 75—43 X |
| 2,526,473 | 10/1950 | Gilliland | 75—43 |
| 2,557,650 | 6/1951 | Gilliland | 75—40 |
| 2,581,597 | 1/1952 | Nissim | 75—40 X |
| 2,612,444 | 9/1952 | Rummel | 75—40 |

FOREIGN PATENTS

| 318,677 | 12/1969 | Sweden | 75—40 |

HENRY W. TARRING II, Primary Examiner

U.S. Cl. X.R.

75—40, 46, 60

UNITED STATES PATENT OFFICE
CERTIFICATE OF CORRECTION

Patent No. 3,734,716          Dated  5/22/73

Inventor(s)  Leonard Seglin and Charles A. Gray

It is certified that error appears in the above-identified patent and that said Letters Patent are hereby corrected as shown below:

Column 2, line 13 "1,804,317" should read --1,084,317--.

Signed and sealed this 19th day of November 1974.

(SEAL)
Attest:

McCOY M. GIBSON JR.          C. MARSHALL DANN
Attesting Officer            Commissioner of Patents